United States Patent [19]
Christ et al.

[11] Patent Number: 6,145,650
[45] Date of Patent: Nov. 14, 2000

[54] APPARATUS AND METHOD FOR TRANSFERRING BLOW-MOLDED CONTAINERS TO A TRIMMER

[75] Inventors: Gary Christ; Garry Montague, both of Bradenton, Fla.

[73] Assignee: Graham Packaging Company L.P., York, Pa.

[21] Appl. No.: 09/240,937

[22] Filed: Jan. 29, 1999

[51] Int. Cl.[7] .................................................. B65G 47/22
[52] U.S. Cl. ........................................... 198/493; 198/438
[58] Field of Search .................................... 198/493, 428, 198/438

[56] References Cited

U.S. PATENT DOCUMENTS

| | | |
|---|---|---|
| 2,851,146 | 9/1958 | Sherrill . |
| 3,198,352 | 8/1965 | Puechberty .......................... 198/493 X |
| 3,329,469 | 7/1967 | Stadelman . |
| 3,398,823 | 8/1968 | Hollenton . |
| 3,603,645 | 9/1971 | Hardy . |
| 3,797,640 | 3/1974 | Aidlin et al. . |
| 4,042,099 | 8/1977 | Sterling . |
| 4,214,663 | 7/1980 | Schopp et al. . |
| 4,369,873 | 1/1983 | Heuft . |
| 4,614,018 | 9/1986 | Krall . |
| 4,773,524 | 9/1988 | Greeves ................................... 198/428 |
| 4,834,643 | 5/1989 | Klinedinst et al. . |
| 4,886,443 | 12/1989 | Klinedinst et al. . |
| 4,986,407 | 1/1991 | Heuft ................................... 198/438 X |
| 5,065,858 | 11/1991 | Akam et al. . |
| 5,135,101 | 8/1992 | Dudley . |
| 5,248,045 | 9/1993 | Alvelda . |
| 5,322,152 | 6/1994 | Tommila et al. . |
| 5,681,597 | 10/1997 | Aguilar et al. . |

*Primary Examiner*—James R. Bidwell
*Attorney, Agent, or Firm*—Howson and Howson

[57] ABSTRACT

Apparatus and method for transferring empty blow molded containers with precisely timed and directed blasts of air to a trimmer. The transfer apparatus includes a first set of air nozzles for transferring multiple bottles at a time from a wheel discharge takeaway conveyor to an index bucket chain of a trimming machine. The containers are blown across a transfer bridge assembly and are prevented from rebounding out of the index bucket chain due to the construction of the bridge assembly and the use of a second set of air nozzles. The second set of air nozzles are located above a path of travel of the transferred containers and fire bursts of air directed downward and forward onto the containers on the transfer bridge and index bucket chain.

20 Claims, 3 Drawing Sheets

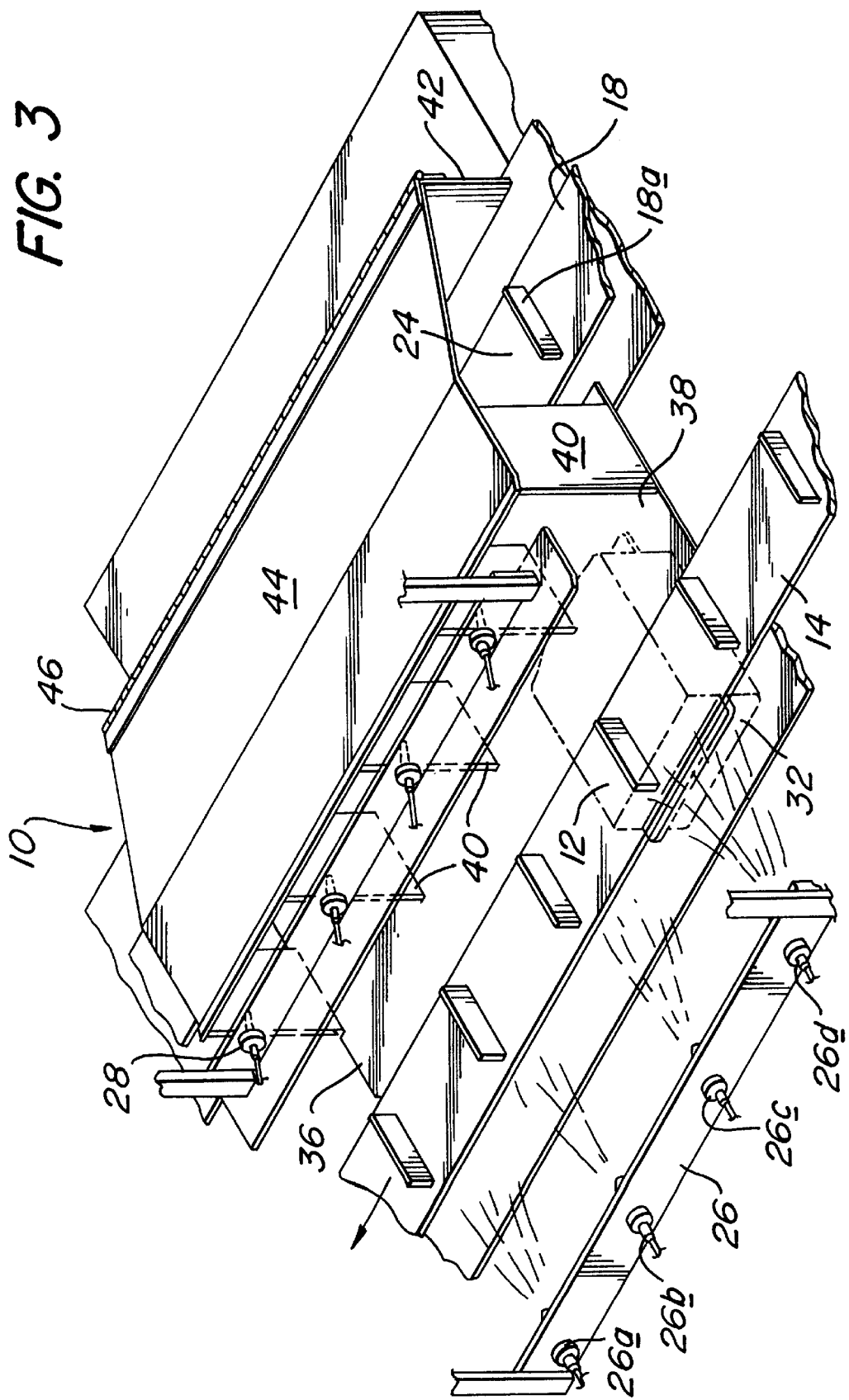

APPARATUS AND METHOD FOR TRANSFERRING BLOW-MOLDED CONTAINERS TO A TRIMMER

FIELD OF THE INVENTION

The present invention relates to a transfer mechanism for efficiently transferring blow-molded containers into a trimming machine, and more particularly, the present invention relates to a mechanism which fires bursts of air to transfer multiple bottles at a time from a takeaway conveyor operating at a continuous speed to an index bucket receiver which sequentially inputs multiple bottles at a time into the trimming machine.

BACKGROUND OF THE INVENTION

Blow molding operations utilized in the manufacture of plastic containers, or bottles, typically include the formation of flash along a mold parting line in one or more areas of the blown container, such as, the shoulder, neck, finish, and handle areas. Thus, a conventional operation includes discharging the containers from blow molds onto a wheel discharge takeaway conveyor which transports the containers to a trimming machine. The trimming machines sever the flash from the containers and may also be utilized to trim the end face of each finish to provide a sealing surface capable of engaging a closure in a leak-free manner.

Trimming machines typically are capable of receiving and trimming multiple containers at a time. Thus, sets of containers are sequentially input into the trimming machine in a start/stop manner. Each set may include, for example, four containers. So-called index bucket chains, or receivers, are typically utilized to input, or index, containers into the trimming machine. The index bucket chain includes a plurality of end-to-end configured buckets which are each capable of holding one container to be input into the trimming machine.

A transfer mechanism is required to transfer the containers from the takeaway conveyor to the index bucket chain of the trimmer. The takeaway conveyor typically operates at a continuous speed. Thus, the transfer mechanism must be precisely synchronized with the movements of the containers on the continuously operating takeaway conveyor and with the movements of the sequentially operating index bucket chain in order to simultaneously transfer multiple containers from the takeaway conveyor to the index bucket chain in a repeated manner. For example, containers may be transferred four at a time from the takeaway conveyor to the index bucket chain and into the trimming machine.

Known transfer mechanisms utilized to transfer containers into trimming machines utilize vacuum pick and place mechanisms. Such mechanisms include vacuum suction heads which physically contact and lift containers from the takeaway conveyor and mechanically position the containers into the trimmer or into the buckets of the index bucket chain of the trimmer. Examples of known vacuum pick and place mechanisms are disclosed in U.S. Pat. No. 4,614,018 issued to Krall, U.S. Pat. No. 5,681,597 issued to Aguilar et al., and U.S. Pat. Nos. 4,886,443 and 4,834,643 issued to Klinedinst et al.

Vacuum pick and place machines have relatively complicated structures and are relatively expensive to build and/or purchase. They require frequent maintenance and are prone to experiencing mechanical and pneumatic failures. The downtime of the pick and place machines can significantly reduce the overall rate of manufacture of containers. Thus, a more efficient and cost-effective transfer mechanism for transferring containers from a takeaway conveyor to an index bucket chain of a trimming machine is desired.

It is known to direct blasts of air at articles to deflect the articles in an intended direction. For example, the embodiment of FIG. 19 of U.S. Pat. No. 4,369,873 issued to Heuft discloses the use of air blasts to laterally deflect upstanding bottles on a conveyor into one of a pair of alternate paths. U.S. Pat. No. 5,322,152 issued to Tommila et al. discloses the use of air blasts to sort various recycled articles, such as upstanding bottles and cans. U.S. Pat. No. 5,135,101 issued to Dudley, U.S. Pat. No. 3,797,640 issued to Aidlin et al., U.S. Pat. No. 3,603,645 issued to Hardy, and U.S. Pat. No. 5,248,045 issued to Alvelda disclose other bottle handling apparatus which utilize blasts of air to accomplish various tasks. U.S. Pat. No. 2,851,146 issued to Sherrill, U.S. Pat. No. 4,214,663 issued to Schopp et al., U.S. Pat. No. 5,065,858 issued to Akam et al., U.S. Pat. No. 4,042,099 issued to Sterling, U.S. Pat. No. 3,329,469 issued to Stadelman and U.S. Pat. No. 3,398,823 issued to Hollenton disclose various mechanisms utilizing blasts of air to transfer non-bottle type of articles, such as cigarettes.

While various ones of the transfer mechanisms disclosed in the above referenced patents may function satisfactorily for their intended purposes under certain circumstances, there is a need for a mechanism and method for efficiently transferring blow-molded containers from a wheel discharge takeaway conveyor to an index bucket chain of a trimming apparatus. The transfer mechanism should have a relatively simple construction which requires a minimum of downtime, if any, and which is cost-effective to manufacture and/or purchase.

OBJECTS OF THE INVENTION

With the foregoing in mind, a primary object of the present invention is to provide a container transfer system which utilizes precisely timed bursts of air to simultaneously transfer multiple containers from a continuously operated takeaway conveyor to a sequentially operated index bucket receiver of a trimming machine.

Another object of the present invention is to provide a high-speed bottle transfer system capable of transferring at least about 110 bottles per minute into a trimming machine.

A further object of the present invention is to provide a high-speed bottle transfer system which requires no significant preventative maintenance and which experiences minimal, if any, downtime.

A still further object of the present invention is to provide a novel method of transferring blow molded containers from a wheel discharge takeaway conveyor into a trimming machine.

SUMMARY OF THE INVENTION

More specifically, the present invention provides an apparatus for transferring empty blow-molded containers to a trimmer having an index bucket receiver which receives and sequentially indexed at least two containers at a time into the trimmer. The apparatus includes a transfer bridge structure located adjacent and between the index bucket receiver of the trimmer and a single file line of uniformly spaced and positioned containers. The containers are conveyed one after the other at a constant speed in a direction parallel to the index bucket receiver, and the transfer bridge provides a path of travel for at least two containers at a time from the single file line to the index bucket receiver of the trimmer.

The apparatus includes a first set of air nozzles located adjacent to the single file line of containers for sequentially directing bursts of air in a transverse direction relative to the single file line of containers such that the bursts of air impinge on at least two containers to simultaneously blow the containers across the transfer bridge and into the index bucket receiver. The air bursts are synchronized with the continuous conveying speed of the single file line of containers and the sequential indexing of containers into the trimmer such that at least two containers at a time are repeatedly transferred from the single file line to the index bucket receiver and into the trimmer in a high speed manner.

Preferably, the apparatus also has a second set of air nozzles located above the path of travel provided by the transfer bridge. The second set of nozzles directs sequential bursts of air in a downward and forward direction on the path of travel such that the bursts of air from the second set of air nozzles ensure that the containers are transferred in a controlled manner across the path of travel and prevent the transferred containers from rebounding back off of the index bucket receiver of the trimmer.

According to another aspect of the present invention, a method is provided for transferring empty blow molded containers from an endless conveyor to a trimmer having an index bucket receiver. Containers are positioned on the conveyor in a uniformly-spaced single file line and transported on the conveyor at a continuous constant speed. Bursts of air are fired from a first set of nozzles in a transverse direction relative to the single file line of containers to impinge simultaneously on at least two of the containers to simultaneously transfer at least two containers to the index bucket receiver. Bursts of air are also fired from a second set of nozzles in a downward and forward direction toward the index bucket receiver to prevent the at least two simultaneously transferred containers from rebounding off of the index bucket receiver. The containers are sequentially fed in a start/stop manner into the trimmer.

BRIEF DESCRIPTION OF THE DRAWINGS

The foregoing and other objects, features and advantages of the present invention should become apparent from the following description when taken in conjunction with the accompanying drawings, in which:

FIG. 3 is a perspective view of the bottle transfer system of FIG. 1.

DETAILED DESCRIPTION OF THE PREFERRED EMBODIMENT

Figure 1:
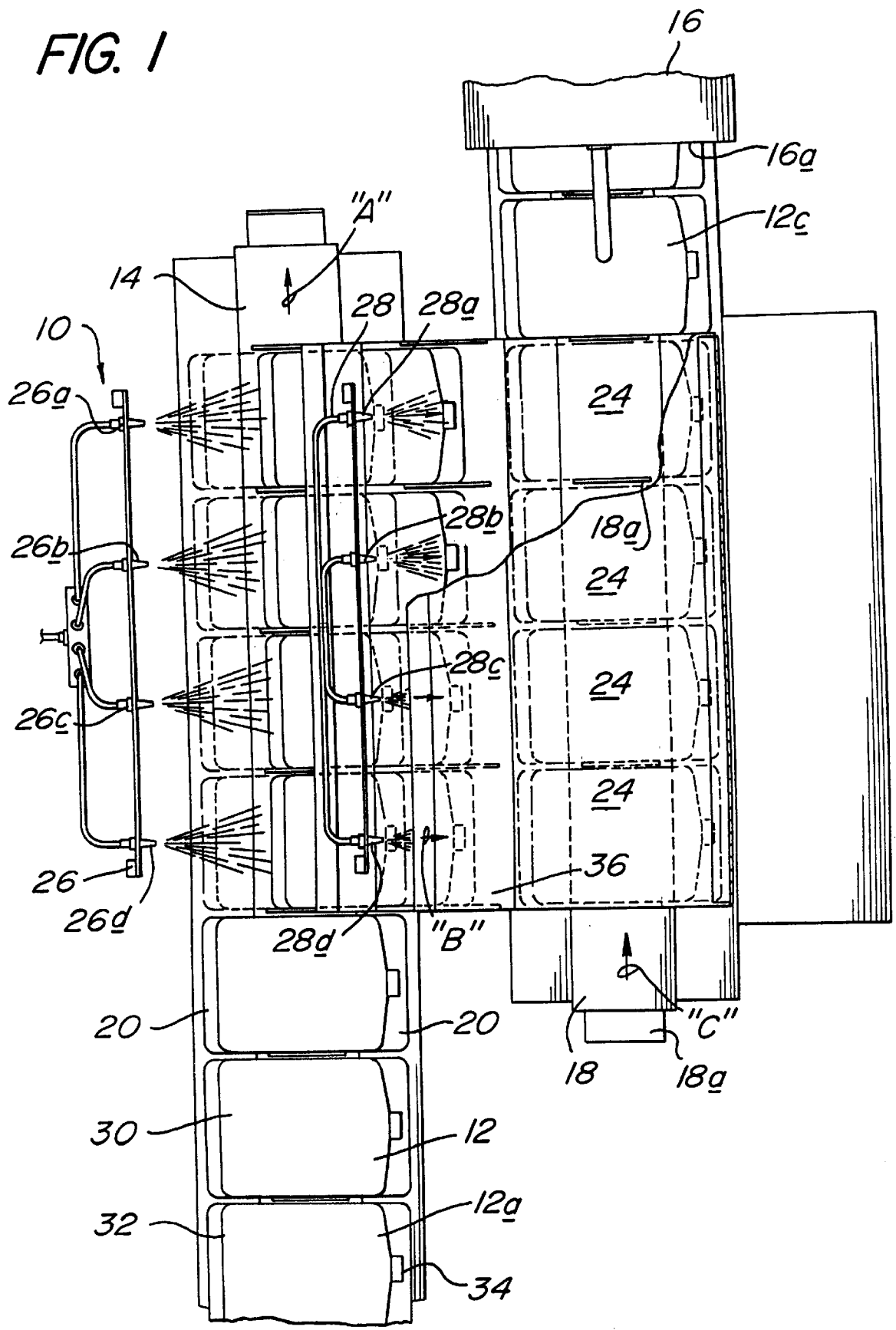
FIG. 1 is a plan view of a bottle transfer system embodying the present invention.

Referring now to the drawings, FIG. 1 illustrates a one direction container, or bottle, transfer apparatus 10 according to the present invention. Typically, empty, hollow blow-molded containers 12 are discharged from blow molds (not shown) onto a takeaway conveyor 14 and transported to the location of a trimmer 16. Thus, arrows "A", "B" and "C" illustrated in FIG. 1 shows the direction of travel of the containers 12 on the takeaway conveyor 14, across the transfer apparatus 10, and into the trimmer 16, respectively.

The takeaway conveyor 14 is illustrated as an endless conveyor structure. Since the containers 12 are being discharged from blow molds onto the takeaway conveyor 14 in a continuous constant speed operation, the takeaway conveyor 14 transfers the containers 12, one after the other, in a uniform single file line 12a at a constant predetermined speed. For example, a blow molding operation may result in the takeaway conveyor 14 delivering about 110 bottles per minute to the location of the trimmer 16.

The trimmer 16 includes apparatus 18 for simultaneously receiving a number of containers 12 and for indexing the containers into the trimmer 16 so that the trimming mechanism (not shown) can remove the flash 20 extending from the containers 12 along their mold parting lines 22. The apparatus 18 is typically a so-called index bucket chain, or receiver, which sequentially feeds a number of containers at a time into the trimmer 16 in a start/stop manner. As illustrated, the index bucket chain 18 can be an endless conveyor having spaced upstanding walls 18a for defining specific slots, or locations, 24 for receiving the containers 12. An example of such a trimmer 16 is a Lyle Quad Trimmer which is designed to index four containers at a time into its trimming mechanism.

As stated previously, conventional practice is to mechanically pick each container 12 from the takeaway conveyor 14 and mechanically place each container 12 on the index bucket chain 18. However, such prior art vacuum pick and place mechanisms (not shown) are relatively complicated machinery which require a significant amount of periodic maintenance and are prone to failure.

To overcome the problems with the prior art, the present invention utilizes a novel transfer apparatus 10 which uses blasts of air at precisely timed intervals from sets of stationary nozzles, 26 and 28, to blow the containers 12 from the takeaway conveyor 14 to the index bucket chain 18. Each set of nozzles, 26 and 28, is connected to a source (not shown) of pressurized air as is well known in the art. The single file line 12a of containers 12 on the takeaway conveyor 14 are transported in direction "A" which is spaced from and substantially parallel with the direction "C" of the containers 12c being indexed into the trimmer 16 by the index bucket chain 18. Thus, a first set of stationary nozzles 26 are positioned relative to the single file line 12a of containers to direct blasts of air to blow the containers toward the index bucket chain 18.

Preferably, each empty container 12 on the takeaway conveyor 14 is positioned on its sidewall 30 with its base 32 disposed upright facing the first set of stationary nozzles 26 and with its finish 34 facing toward the index bucket chain 18. The mold parting lines 22 of the containers are preferably disposed substantially parallel to the horizontal. As best illustrated in FIG. 2, one of the nozzles 26a of the first set of nozzles 26 is positioned at an elevation which causes its burst of air to impinge directly on the base 32 of one of the containers 12 with a sufficient amount of force to impart movement to the container 12 in the direction "B" toward the index bucket chain 18.

In addition, preferably the containers 12 on the takeaway conveyor 14 are equally spaced apart at predetermined distances to enable multiple containers to be simultaneously transferred. For example, as best illustrated in FIG. 1, the first set of nozzles 26 can include four nozzles, 26a–d, mounted at predetermined horizontally spaced-apart distances for directing four simultaneous and separate blasts of air at precise intervals of time for transferring containers, four at a time, from the takeaway conveyor 14 to the index bucket chain 18.

A synchronizing device (not shown) is utilized to determine when a set of the containers are in a position to be simultaneously transferred and when the nozzles should be triggered to fire the air bursts. The synchronizing device also prevents the nozzles from firing until a full set of containers are in position to be transferred. The synchronizing device could be, for instance, a sensor for sensing the position of the containers 12 on the takeaway conveyor 14 or for sensing the movement of the takeaway conveyor 14. Preferably, an encoder (not shown) is used on the takeaway conveyor as a signaling device to an existing PLC (not shown) in the trimmer to synchronize the operations of the takeaway conveyor and the trimmer. In addition, the timing of the air bursts and the duration of air burst are preferably programable and can be changed on the fly while the transfer apparatus is running.

Figure 2:
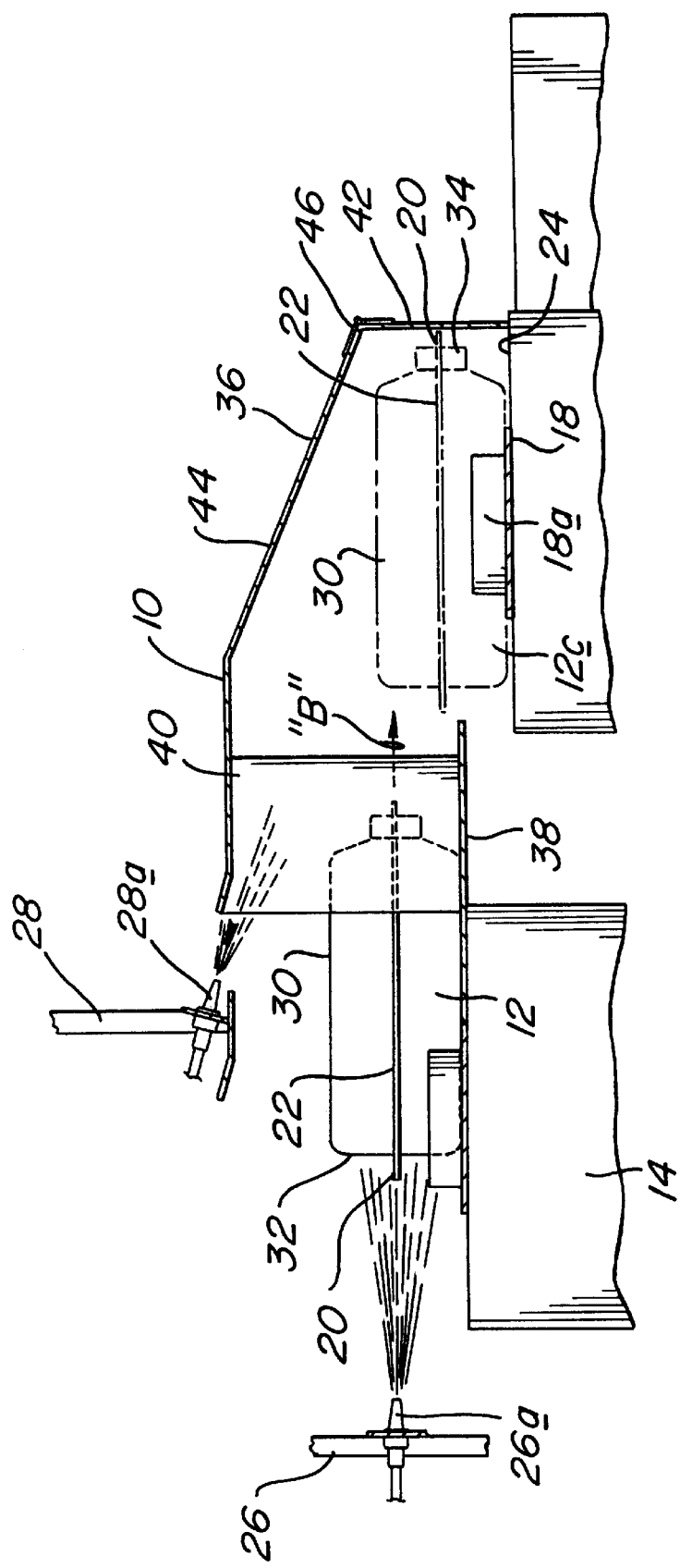
FIG. 2 is an elevational view of the bottle transfer system of FIG. 1.

As best illustrated in FIGS. 2 and 3, the transfer apparatus 10 includes a transfer bridge assembly 36 extending transversely from the takeaway conveyor 14 to the index bucket chain 18 at a location adjacent the entrance 16a of the trimmer 16. The transfer bridge assembly 36 provides a path of travel in the direction "B" for the containers being transferred from the takeaway conveyor 14 to slots 24 on the index bucket chain 18. To this end, each container blown off of the takeaway conveyor 14 is slidable received on a planar base portion 38 of the bridge assembly 36. A plurality of upstanding guide walls 40 project from the base portion 38 and guide the containers into adjacent slots 24.

As best illustrated in FIG. 2, preferably the elevation of the base portion 38 is substantially the same as the elevation of the transfer conveyor 14, but slightly higher than the elevation of the index bucket chain 18. This downwardly stepped configuration aids in preventing the containers 12 from rebounding off of the index bucket chain 18 and back onto the transfer bridge assembly 36. The bridge assembly 36 also includes a rear wall 42 which provides a stop for the transferred containers and a lid 44 which prevents containers from lifting off of the bridge assembly 36. The lid 44 is connected to the rear wall 44 by a hinge 46.

The transfer apparatus 10 includes a second set of air nozzles 28 which further ensures that containers are transferred in a controlled manner onto the index bucket chain 18. As best illustrated in FIG. 2, the second set of air nozzles 28 is located above the path of travel of the containers on the transfer bridge assembly 36 and directs bursts of air in a direction downward and forward onto the containers located on the base portion 38 of the transfer bridge 36 and on the containers 12c located on the index bucket chain 18. FIG. 1 illustrates the use of four nozzles, 28a–d, one for each container being simultaneously transferred. The bursts of air fired by the second set of nozzles 28 are of a sufficient strength and for a precisely synchronized interval of time to prevent the containers from lifting upwardly or out of the index bucket chain 18.

Preferably, a synchronizing device (not shown) is utilized to determine the precise time of firing of the second set of nozzles. The synchronizing device could be, for instance, a sensor for sensing the position of the containers 12 on the transfer bridge assembly 36, a sensor for sensing the movement of the takeaway conveyor 14 or the index bucket chain 18, or an auxiliary timing device which initiates firing a short time delay after the first set of nozzles fire.

By way of example, and not by way of limitation, the high-speed, fully-automated transfer apparatus 10 transfers about 120 bottles per minute, four bottles at a time, into the trimmer 16. The bottles could be sized to package about ninety-six ounces of a liquid product, such as, orange juice. The single file line 12a of containers are advanced in direction "A" at a constant speed of about 20 feet per second. Each nozzle in the first set of nozzles 26 fires a burst of air at about 80 psi for a duration of about 0.1 second in order to transfer the containers to the index bucket chain 18. Each nozzle in the second set of nozzles 28 is located about 6 inches above the base portion 38 of the transfer bridge assembly 36 and is directed at an angle of approximately 15° below the horizontal. Each nozzle in the second set of nozzles 26 fires a burst of air at about 40 psi for a duration of about 2 seconds.

DETAILED DESCRIPTION OF THE PREFERRED METHOD

The transfer apparatus 10 is utilized in a novel method of transferring empty blow molded containers from a takeaway conveyor to a trimmer. To this end, containers are positioned on the takeaway conveyor 14 in a uniformly-spaced single file line 12a. Typically, the containers 12 are directly discharged from the blow-molds of a wheel blow-molding machine onto the takeaway conveyor 14. The single file line 12a of containers are advanced at a constant speed to adjacent a trimmer 16. Bursts of air are fired from a first set of nozzles to simultaneously impinge on at least two of the containers to simultaneously transfer at least two of the containers to an index bucket receiver 18 of the trimmer 16. Bursts of air are also fired from a second set of nozzles to prevent the simultaneously transferred containers from rebounding off of the index bucket receiver 18. The transferred containers are then sequentially fed, at least two containers at a time, into the trimmer 16.

The timing between the takeaway conveyor 14 and the index bucket chain 18 can be readily synchronized along with the firing of the first and second sets of nozzles, 26 and 28. The containers can be efficiently transferred in a high speed manner, for instance, four bottles at a time, at about 120 containers per minute.

Thus, the above-described bottle transfer apparatus and its method of use according to the present invention provide an efficient, cost-effective, high speed means of transferring empty blow-molded containers to a trimmer. The transfer mechanism utilizes blasts of air to transfer the containers in a controlled manner. The mechanism utilizes no mechanical parts; thus, downtime caused by maintenance and repair are reduced. In addition, the cost of manufacturing and/or buying such a mechanism is less than that of known vacuum pick and place machines.

While a preferred apparatus and method have been described in detail, various modifications, alterations, and changes may be made without departing from the spirit and scope of the transfer apparatus and method according to the present invention as defined in the appended claims.

What is claimed is:

1. Apparatus for transferring empty blow-molded containers to a trimmer having an index bucket receiver for receiving and sequentially indexing into the trimmer at least two containers at a time, comprising:

a transfer bridge located adjacent and between the index bucket receiver of the trimmer and a single file line of uniformly spaced and positioned containers being conveyed one after the other at a continuous constant speed in a direction parallel to the index bucket receiver, said transfer bridge providing a path of travel for at least two containers being simultaneously transferred from said single file line to the index bucket receiver of the trimmer; and a first set of air nozzles located adjacent to said single file line of containers for sequentially directing bursts of air in a transverse direction relative to said single file line of containers such that said bursts of air impinge on at least two containers to simultaneously blow the containers across said transfer bridge and into the index bucket receiver of the trimmer;

said air bursts from said first set of air nozzles being synchronized with said continuous conveying speed of said single file line of containers and the sequential indexing of containers into the trimmer such that at least two containers at a time are repeatedly transferred from said single file line to the index bucket receiver and into the trimmer.

2. Apparatus according to claim 1, further comprising a second set of air nozzles located above said path of travel provided by said transfer bridge for sequentially directing bursts of air in a downward and forward direction on said path of travel such that said bursts of air from said second set of air nozzles ensure that the containers are transferred in a controlled manner across said path of travel and prevent the transferred containers from rebounding back off of the index bucket receiver of the trimmer.

3. Apparatus according to claim 2, wherein said bursts of air of said first set of nozzles simultaneously transfer four containers at a time from said single file line to the index bucket receiver.

4. Apparatus according to claim 3, wherein said bursts of air of said first set of air nozzles and said continuous constant conveyed speed of said single file line of containers are timed such that at least about 120 containers per minute are transferred from said single file line of containers to the index bucket receiver and into the trimmer.

5. Apparatus according to claim 1, further comprising a sensor capable of detecting when at least two containers are in a position to be hit with said burst of air from said first set of nozzles and capable of causing said first set of nozzles to fire said air blast.

6. Apparatus according to claim 2, further comprising a sensor capable of detecting when at least two containers are being transferred across said path of travel and capable of causing said second set of nozzles to fire said air blast.

7. Apparatus according to claim 2, wherein each container on said single file line has a base and a sidewall and is conveyed on its sidewall with its base disposed in a substantially upright position; and wherein said bursts of air of said first set of nozzles are directed to impinge flush on the base of each container being transferred.

8. Apparatus according to claim 2, wherein said first and second set of nozzles each include one nozzle per container being simultaneously transferred across said path of travel of said bridge.

9. Apparatus according to claim 2, wherein said bursts of air of said second set of nozzles are angled downwardly about 15° relative to the horizontal.

10. Apparatus according to claim 2, wherein each of said air bursts from said first set of nozzles is at least about 60 psi for period of less than about 0.5 seconds.

11. Apparatus according to claim 2, wherein each of said air bursts from said second set of nozzles is at least about 20 psi for period of about greater than 1 second.

12. Apparatus according to claim 2, wherein said transfer bridge includes a set of upstanding walls for defining a separate paths of travel for each container simultaneously being transferred across said transfer bridge.

13. An apparatus for transferring empty, hollow, plastic, blow-molded bottles to a trimming machine, each bottle having a base, a sidewall, a finish, and flash extending outwardly from the base and finish along a mold parting line, the bottles being disposed on their sidewalls with their mold parting lines in a substantially parallel relation with the horizontal and with their bases in a substantially upright vertical position and being transported at a constant continuous speed on a takeaway conveyor in a uniform single file manner to a location where the bottles are transferred to an index bucket receiver which sequentially indexes at least two bottles at a time into the trimming machine, comprising:

a transfer bridge extending between the takeaway conveyor and the index bucket receiver and defining at least two adjacent parallel paths of travel for bottles simultaneously transferring from the takeaway conveyor to the index bucket receiver of the trimming machine, said paths of travel extend in a transverse direction relative to the bottles being conveyed in single file on the takeaway conveyor and the bottles indexed into the trimming machine on the index bucket receiver;

a first set of air nozzles located adjacent to the takeaway conveyor for sequentially directing bursts of air in a transverse direction across the takeaway conveyor to impinge on the bases of at least two bottles to simultaneously blow the at least two bottles across said transfer bridge and onto the index bucket receiver; and a second set of air nozzles located above said transfer bridge for sequentially directing bursts of air in a downward and forward direction relative to said paths of travel to prevent the at least two simultaneously transferred bottles from rebounding out of the index bucket receiver;

said air bursts from said first and second set of air nozzles being synchronized with the continuous constant speed of the takeaway conveyor and the sequential indexing of the index bucket receiver such that at least two bottles at a time are repeatedly transferred from the takeaway conveyor to the trimming machine.

14. Apparatus according to claim 13, further comprising a first sensor capable of detecting when at least two bottles are in a position on the takeaway conveyor to be hit with a burst of air and capable of causing said first set of nozzles to fire a burst of air; and a second sensor capable of detecting when at least two bottles are being transferred across said paths of travel and capable of causing said second set of nozzles to fire a burst of air.

15. Apparatus according to claim 14, wherein said bursts of air of said first set of nozzles simultaneously transfer at least four bottles at a time from the takeaway conveyor to the index bucket receiver of the trimmer.

16. Apparatus according to claim 15, wherein said first and second set of nozzles each include one nozzle per bottle being simultaneously transferred across said paths of travel of said transfer bridge.

17. Apparatus according to claim 16, wherein said transfer bridge includes a set of upstanding walls for defining a separate path of travel for each bottle simultaneously being transferred across said transfer bridge.

18. A method of transferring empty blow molded containers from an endless conveyor to a trimmer having an index bucket receiver, the steps comprising:

positioning the containers on the conveyor in a uniformly-spaced single file line;

transporting said single file line of containers on the conveyor at a continuous constant speed;

firing bursts of air from a first set of nozzles at a transverse direction relative to said single file line of containers to impinge simultaneously on at least two of the containers to simultaneously transfer said at least two containers to the index bucket receiver;

firing bursts of air from a second set of nozzles at a downward and forward direction toward the index bucket receiver to prevent said at least two simultaneously transferred containers from rebounding off of said index bucket receiver; and sequentially feeding in a start/stop manner at least two containers at a time on the index bucket receiver into the trimmer.

19. A method according to claim 18, further comprising the steps of sensing when said at least two containers are in a position on the conveyor to be hit with a burst of air from said first set of nozzles to transfer said containers to the index bucket receiver, and sensing when said at least two containers are being transferred and should be hit with a burst of air from said second set of nozzles.

20. A method according to claim 19, wherein at least four containers are simultaneously transferred from the conveyor to the index bucket receiver, and wherein at least about 120 containers per minute are transferred from the conveyor to the trimmer.

* * * * *